C. J. MOGAN.
REINFORCEMENT FOR CONCRETE.
APPLICATION FILED MAY 21, 1910.
984,775.
Patented Feb. 21, 1911.
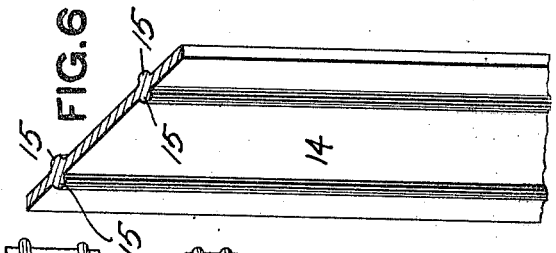
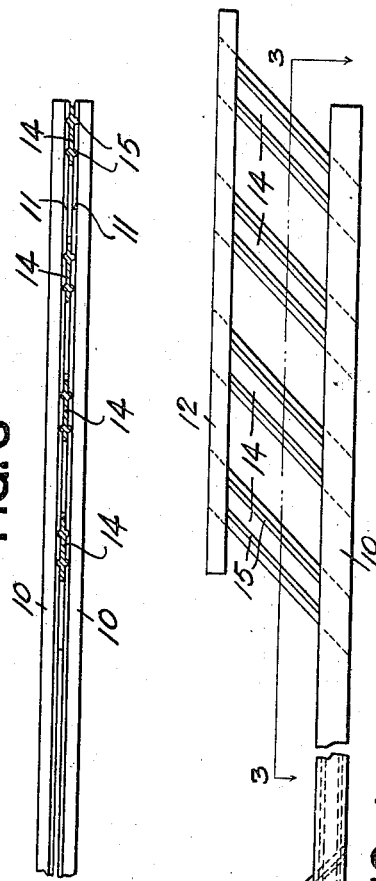
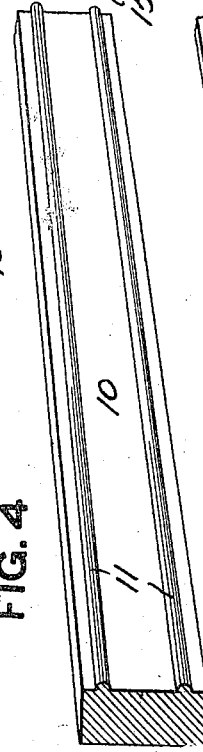
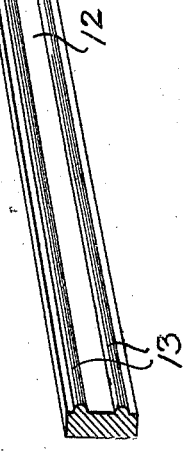
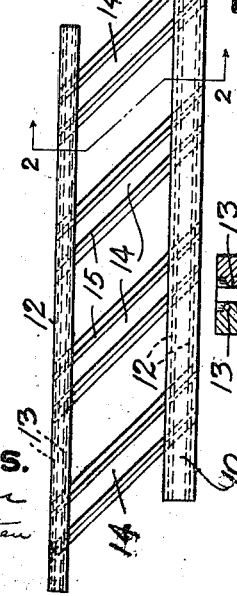
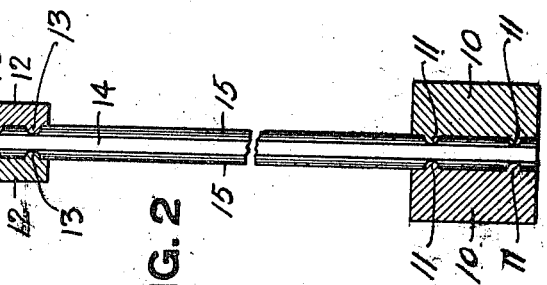
WITNESSES.
J. R. Keller
Robt. C. Totten
INVENTOR.
Christopher J. Mogan
By Kay & Totten
Attorneys

UNITED STATES PATENT OFFICE.

CHRISTOPHER J. MOGAN, OF GLASSPORT, PENNSYLVANIA, ASSIGNOR TO PITTSBURGH STEEL PRODUCTS CO., OF PITTSBURG, PENNSYLVANIA, A CORPORATION OF PENNSYLVANIA.

REINFORCEMENT FOR CONCRETE.

984,775.

Specification of Letters Patent. Patented Feb. 21, 1911.

Application filed May 21, 1910. Serial No. 562,643.

*To all whom it may concern:*

Be it known that I, CHRISTOPHER J. MOGAN, a resident of Glassport, in the county of Allegheny and State of Pennsylvania, have invented a new and useful Improvement in Reinforcements for Concrete; and I do hereby declare the following to be a full, clear, and exact description thereof.

My invention relates to a reinforcement for concrete construction, its object being to provide a reinforcement in which the strains are evenly distributed centrally of the reinforcement so as to prevent undue strains on one side or the other of the same.

In the accompanying drawings Figure 1 is a side elevation of my improved reinforcement; Fig. 2 is an enlarged cross-section on the line 2—2 Fig. 1; Fig. 3 is a section on the line 3—3 Fig. 1; Fig. 4 is a perspective view of one of the longitudinal bars; Fig. 5 is a perspective view of one of the upper longitudinal bars; and Fig. 6 is an enlarged perspective view of one of the shear members.

The numeral 10 designates the lower longitudinal bars which are rolled with the ridges 11 extending along one side longitudinally thereof. The upper longitudinal bars 12 are likewise rolled with the ridges 13 extending along one side longitudinally thereof, and said upper bars are preferably of lighter section than the lower or tension bars 10. The shear members 14, which may be formed of strips of metal with the ribs or ridges 15 rolled thereon on opposite sides, are held between the pairs of bars 10 and 12 and are weldably united to said bars. I prefer to weld the shear members and the bars 10 and 12 by means of electricity, and the ridges 11 and 13 on the bars 10 and 12 together with the ridges 15 on the shear members provide the proper contact surfaces for the welding of the bars and shear members electrically. The shear members are inserted between the bars and may be temporarily clamped into position during the welding operation which is done in the ordinary manner of what is termed spot welding, the current when applied heating the ridges on the bars and shear members where they intersect due to the resistance created by the passage of the current and the weld is then completed by slight pressure, so that the parts when welded will have the appearance indicated in Fig. 2 of the drawings.

The reinforcement produced in this manner has the shear members held between pairs of longitudinal upper and lower bars so that the reinforcement is evenly balanced, the strains being central of the reinforcement. When the said reinforcement is embedded in the concrete, the strains will be evenly distributed, and furthermore the concrete fills up the space between the bars which is formed by the interposed shear members, thereby forming recesses for holding the concrete and making a tighter bond between the reinforcement and the concrete.

What I claim is:

1. A reinforcement for concrete construction, comprising lower and upper spaced longitudinal bars rectangular in cross-section and having welding projections formed on one side thereof, and shear members having welding projections on both sides thereof with their ends between pairs of said bars and electrically welded thereto.

2. A reinforcement for concrete construction comprising upper and lower spaced longitudinal bars rectangular in cross-section having longitudinally extending ridges formed on one side thereof, and shear members having longitudinally extending ridges on opposite sides thereof with their ends held between pairs of said longitudinal bars and electrically welded thereto.

In testimony whereof, I the said CHRISTOPHER J. MOGAN have hereunto set my hand.

CHRISTOPHER J. MOGAN.

Witnesses:
ROBERT C. TOTTEN,
JOHN F. WILL.